Patented Nov. 19, 1929

1,735,960

UNITED STATES PATENT OFFICE

HENRY DREYFUS, OF LONDON, ENGLAND

DYEING OF MATERIALS MADE OF OR CONTAINING CELLULOSE DERIVATIVES

No Drawing. Application filed March 12, 1927, Serial No. 175,012, and in Great Britain December 14, 1926.

This invention relates to the dyeing, printing or stencilling of threads, yarns, knitted or woven fabrics or other products made of or containing cellulose acetate or other organic acid esters of cellulose, such for example as cellulose formate, propionate or butyrate, or the product obtained by the treatment of alkalized cellulose with p-toluene sulphochloride (e. g. the product known as "immunized cotton"), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

According to this invention materials made with or containing one or more of the said organic substitution derivatives of cellulose are dyed or otherwise colored with coloring matters or compounds containing one or more urethane or substituted urethane residues, that is coloring matters or compounds in which an aryl dye nucleus or component thereof is linked directly or indirectly to the nitrogen atom of any ester of carbamic acid, or of substituted carbamic acids.

Further according to the present invention such coloring matters may be formed on the fibre or material by combination of components, one or more of which contain such urethane or substituted urethane residues.

The compounds for use according to the present invention may be prepared by any convenient method. Thus for example they may be prepared by heating the corresponding isocyanate compounds with alcohols or alkali metal alcoholates or mixtures thereof or with alcoholic caustic alkali, by treating the corresponding urea chloride compounds with alcohols or alkali metal alcoholates or mixtures thereof, or by treating a halogen compound containing an aryl dye nucleus or component thereof with an ester of carbamic acid. The urethane compounds may further be prepared by treatment of an amino compound with a chloroformic ester.

The following examples of coloring matters or compounds for use according to the present invention and of the methods of preparing them are intended to be illustrative and not in any way limitative.

A. Anthraquinone dyestuffs

*Example 1.*—4.8-dichlor-1.5-diacetyldiaminoanthraquinone is refluxed with excess of methyl urethane ($NH_2.COOCH_3$) in presence or absence of a solvent or diluent. The dyestuff obtained

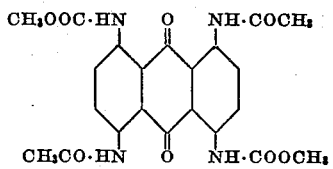

has particularly good affinity for cellulose acetate materials. The same body may be obtained by treatment of 1.5 diaminoanthraquinone with methylchloroformate ($Cl.COOCH_3$), dinitration of the product and reduction followed by acetylation.

B. Azo dyestuffs

*Example 2.*—2-4-dinitraniline is diazotized and coupled with o-hydroxyphenylurethane to obtain the dyestuff

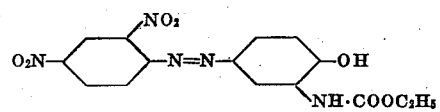

Azo dyestuffs may be produced on the fibre or material in a similar manner by the coupling of components (base or aminoazo compound and developer) one or more of which contain urethane residues.

*Example 3.*—The product obtained by condensation of 5-chlor-o-anisidine with urethane ($NH_2.COOC_2H_5$) is diazotized and coupled with aniline, yielding a product of the probable formula

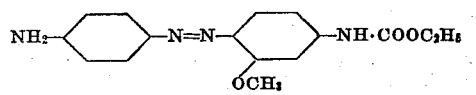

Cellulose acetate artificial silk is dyed with the product in the form of its hydrochloride and the dyeing is diazotized and developed with o-hydroxyphenylurethane.

C. Miscellaneous dyestuffs

*Example 4.*—4.4'-dinitrodiphenylurethane (obtained by treatment of the product from chloroformic ester and diphenylamine with cold nitric acid) dyes cellulose acetate yellow shades.

*Example 5.*—2-nitro.4.4'-diaminodiphenylmethane is condensed with an excess of phenylchlorformate ($Cl.COOC_6H_5$) to obtain the dyestuff

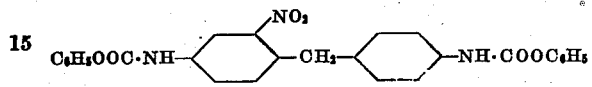

*Example 6.*—Chloranthrapyridone is condensed with the methyl derivative of methyl urethane ($CH_3.NH.COOCH_3$) to obtain a dyestuff having the formula

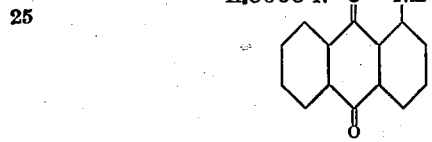

The dyestuffs or compounds may be applied in aqueous solution (where they are sufficiently soluble, and I prefer to employ this method when possible. The dyestuffs or compounds may be made more soluble by the introduction of side chains containing one, two, three or more hydroxy groups for example side chains of the type described in U. S. applications S. No. 162,936 and S. No. 162,937.

When, however, the dyestuffs or compounds are not sufficiently soluble they may be applied to the goods in aqueous suspension or in colloidal solutions or dispersions obtained by grinding (for example in colloid mills), by dissolving in a solvent and pouring into water containing or not containing protective colloids, by pretreating the coloring matters or compounds with solubilizing agents or by other methods. Of the solubilizing agents which are suitable for obtaining such dispersions I may mention those described in U. S. Patents Nos. 1,618,413 and 1,618,414 and application Serial No. 50,525, and in British Patents Nos. 273,819 and 273,820 and/or the corresponding U. S. applications Serial Nos. 134,138 and 176,289; viz bodies of oily or fatty characteristics, namely higher fatty acids or sulphonated or other derivatives thereof containing salt forming groups, such as sulphoricinoleic acid or other sulphonated fatty acids or salts of such acids or bodies, for instance their alkali or ammonium salts, used alone or in conjunction with auxiliary solvents as described in U. S. applications S. No. 48,666 and S. No. 152,517; carbocyclic compounds containing in their structure one or more salt forming groups or salts of such compounds; sulpho-aromatic fatty acids or salts thereof; and soluble resin soaps or sodium or other soluble salts of resin acids.

Though coloring matters and compounds belonging to particular groups have been described above, it is to be understood that the invention is not limited to coloring matter or compounds of these groups, but comprises broadly the application to materials made of or containing cellulose acetate or other of the herein described organic substitution derivatives of cellulose of coloring matters or compounds in which an aryl dye nucleus or component thereof is linked either directly or indirectly to one or more urethane or substituted urethane residues. In the case of using components of aryl dye nuclei the actual coloring matters may be produced on the fibre or material.

Mixed goods containing for example, in addition to the organic substitution derivative or derivatives of cellulose, cotton, silk, wool, or the cellulose type of artificial silk or other fibres or threads, may be dyed or otherwise colored with or without employment of other dyestuffs or components according to the character of the threads or fibres used in association, said other dyestuffs or components being applied if desired before or after the application of the coloring matters or compounds of the present invention, or when not deleteriously affected thereby, they may be applied in conjunction therewith.

The term dyeing in the claims is to be understood to include printing and stencilling and also to include the case when the actual dye compound is produced on the material itself by interaction of components, as for example when dyeing by the azoic process.

What I claim and desire to secure by Letters Patent is:—

1. Process for dyeing material comprising an organic substitution derivative of cellulose, comprising dyeing the material with a coloring compound which comprises at least one urethane residue.

2. Process according to claim 1, characterized in that the coloring compound is applied in aqueous solution.

3. Process according to claim 1, characterized in that the coloring compound is applied in aqueous colloidal solution.

4. Process for dyeing material comprising an organic substitution derivative of cellulose, comprising dyeing the material with a coloring compound which comprises at least one substituted urethane residue.

5. Process for dyeing material comprising an organic substitution derivative of cellulose, comprising dyeing the material with an azo coloring compound which comprises at least one urethane residue.

6. Process for dyeing material comprising cellulose acetate, comprising dyeing the material with a coloring compound which comprises at least one urethane residue.

7. Process according to claim 6, characterized in that the coloring compound is applied in aqueous solution.

8. Process according to claim 6, characterized in that the coloring compound is applied in aqueous colloidal solution.

9. Process for dyeing material comprising cellulose acetate, comprising dyeing the material with a coloring compound which comprises at least one substituted urethane residue.

10. Process for dyeing material comprising cellulose acetate, comprising dyeing the material with an azo coloring compound which comprises at least one urethane residue.

11. Material comprising an organic substitution derivative of cellulose, dyed with a coloring compound which comprises at least one urethane residue.

12. Material comprising cellulose acetate, dyed with a coloring compound which comprises at least one urethane residue.

In testimony whereof I have hereunto subscribed my name.

HENRY DREYFUS.